US008675911B2

(12) United States Patent
Barbier et al.

(10) Patent No.: US 8,675,911 B2
(45) Date of Patent: Mar. 18, 2014

(54) SYSTEM FOR OPTICALLY DETECTING POSITION AND/OR ORIENTATION OF OBJECTS COMPRISING AT LEAST TWO COPLANAR SENSORS

(75) Inventors: Bruno Barbier, Bordeaux (FR); Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 1065 days.

(21) Appl. No.: 12/567,228

(22) Filed: Sep. 25, 2009

(65) Prior Publication Data
US 2010/0098325 A1 Apr. 22, 2010

(30) Foreign Application Priority Data
Sep. 26, 2008 (FR) ...................... 08 05318

(51) Int. Cl.
*G06K 9/00* (2006.01)
(52) U.S. Cl.
USPC ........... 382/103; 382/154; 382/291; 348/169; 356/620
(58) Field of Classification Search
USPC .................. 382/103, 154, 291; 348/169–172; 356/614–624
See application file for complete search history.

(56) References Cited

U.S. PATENT DOCUMENTS

| 5,267,014 | A | * | 11/1993 | Prenninger | ............... 356/139.03 |
| 5,440,114 | A | | 8/1995 | Barbier | |
| 5,465,177 | A | | 11/1995 | Barbier et al. | |
| 5,513,276 | A | * | 4/1996 | Theodoracatos | ............. 382/154 |
| 5,534,689 | A | | 7/1996 | Barbier et al. | |
| 5,617,335 | A | | 4/1997 | Hashima et al. | |
| 5,661,608 | A | | 8/1997 | Barbier et al. | |
| 5,767,524 | A | | 6/1998 | Barbier et al. | |
| 5,974,365 | A | | 10/1999 | Mitchell | |
| 6,630,915 | B1 | * | 10/2003 | Flood | ................. 345/8 |
| 7,826,641 | B2 | * | 11/2010 | Mandella et al. | ............. 382/106 |
| 8,098,383 | B2 | * | 1/2012 | Rouzes | ......................... 356/614 |
| 8,243,992 | B2 | * | 8/2012 | Rouzes et al. | ................ 382/103 |
| 8,259,307 | B2 | * | 9/2012 | Lacoste et al. | ................ 356/614 |
| 2010/0085581 | A1 | | 4/2010 | Barbier | |
| 2010/0098325 | A1 | * | 4/2010 | Barbier et al. | ................ 382/154 |
| 2010/0278387 | A1 | * | 11/2010 | Agurok et al. | ................ 382/103 |

FOREIGN PATENT DOCUMENTS

| FR | 2 905 455 A | 3/2008 |
| FR | 2 905 456 A | 3/2008 |
| FR | 2 920 546 A | 3/2009 |

OTHER PUBLICATIONS

Wang, et al. "EM enhancement of 3D head pose estimated by point at infinity", Image and Vision Computing, vol. 25, Issue 12, Dec. 2007, pp. 1864-1874.

* cited by examiner

*Primary Examiner* — Aaron W Carter
(74) *Attorney, Agent, or Firm* — LaRiviere, Grubman & Payne, LLP

(57) ABSTRACT

The electro-optical system for determining position and orientation of a mobile part comprises a fixed projector having a center of projection (O) and a mobile part. The projector is rigidly linked with a virtual image plane, and the mobile part is rigidly linked with two linear sensors defining a first and a second direction vector. The fixed part projects onto the image plane and onto the sensors patterns, not represented, forming at least two secant networks of at least three segments that are each parallel. The two electro-optical devices are coplanar and their directions secant, the orientation and the position of the mobile part are determined by calculating the positions of the projections on the image plane of a first triple of points comprising the projections of three points.

8 Claims, 5 Drawing Sheets

SYSTEM FOR OPTICALLY DETECTING POSITION AND/OR ORIENTATION OF OBJECTS COMPRISING AT LEAST TWO COPLANAR SENSORS

PRIORITY CLAIM

This application claims priority to French Patent Application Number 08 05318, entitled Systeme De Detection Optique De Position Et/Ou D'Orientation D'Objets Comprenant Au Moins Deux Capteurs Coplanaires, filed on Sep. 26, 2008.

TECHNICAL FIELD

The present invention relates to the field of devices for optically detecting position and orientation of objects in space. It applies more particularly in the aeronautical field where in this case the detected object is a pilot helmet.

BACKGROUND OF THE INVENTION

The determination of the positioning of a point in space and the determination of the attitude of an arbitrary object are problems relating to numerous technical fields.

The various solutions generally afforded must resolve any ambiguity in position or attitude, cater for more or less severe dynamics of the systems and satisfy high accuracy, in particular in the aeronautical field.

In systems for detecting position and attitude of objects in space catering for an accuracy of a few millimeters in position and a degree in attitude, numerous applications exist in various fields.

These systems are used in aeronautics, for detecting head posture, notably for the helmets of fighter aircraft, or of military, civilian or para-civilian helicopters. The latter case of para-civilian application may involve rescue missions at sea for example. They are also used for the detection of simulation helmets; this detection can then be combined with an oculometry device, also called an eyetracker, for detecting the position of the gaze. Numerous applications of these systems also exist in the field of virtual reality and games.

More generally, in the field of generic posture detection, there also exist numerous applications, notably in the medical field for remote operations and monitoring of instruments, in the field of position monitoring for feedback-controlled tool machines or of remote control and finally for cinema, so as to reproduce motion as synthesis images.

These various applications have technical solutions which cater for more or less constraining requirements.

Concerning applications with weak constraints, notably in terms of accuracy, there exist various systems for detecting position and/or orientation of objects.

For example, camera-based devices that recognize patches or shapes use designs printed on an object. Several cameras observe the scene and determine the spatial configuration of the observed design.

There also exist camera-based devices that recognize spheres, which are used, for example in cinema, to reconstruct human motion. The device uses several cameras which observe reflecting spheres and determine their trajectory.

Finally there exist ultrasound positioning devices relying on the principle of triangulation between ultrasonic emitters and receivers.

Concerning higher-performance applications, in particular in the aeronautical field, devices for detecting posture of helmets in aircraft use two main techniques, namely electromagnetic posture detection and electro-optical posture detection.

Electromagnetic posture detection requires devices comprising means for emitting an electromagnetic field and reception sensors on the helmet making it possible to determine their position with respect to the emitter.

Electro-optical posture detection generally requires patterns of electroluminescent diodes, also called LEDs, disposed on the helmet and several sensors of camera type mounted in the cockpit making it possible to determine the spatial configuration of a pattern of LEDs.

To improve performance, other devices comprising sensors of gyroscopic, accelero-metric or magneto-metric types are frequently combined. This hybridization of sensors makes it possible to improve the dynamic performance or to resolve an ambiguity of orientation. These sensors do not modify the static positioning performance of the detection devices cited above.

Nevertheless, these solutions exhibit a certain number of drawbacks and limitations, particularly in the aeronautical field.

As far as the electro-optical devices are concerned, the map of the cockpit or more generally the topology of the zone containing the object must be known. In aeronautics, this topology may undergo deformations or be difficult to map.

Moreover, these same devices require several cameras and several sensors. The position calculations demand numerous resources and the real-time analysis is complex to implement.

Moreover, the diffusion in the zone of detection of the light of the LEDs does not make it possible to circumvent completely the disturbances of the luminous environment of the cockpit due to the sun or to stray reflections on the canopy.

As regards electromagnetic posture detection devices, robust solutions are difficult to implement.

In particular, in the aeronautical field, stray radiations and electromagnetic disturbances may degrade the performance of the existing systems.

A solution implementing a device of electro-optical type such as described in patent FR 2 905 455 makes it possible to circumvent the drawbacks of the electromagnetic devices.

Moreover, this solution preferably uses image projection means of the holographic video-projector type.

In particular, monochromatic holographic video-projectors have the advantages of emitting in a very narrow band of frequencies, a sharp image in a wide field and of making it possible to concentrate a high energy in a very small zone. The signals arising from the holographic video-projector can very easily be distinguished from stray light.

More precisely, this solution comprises electro-optical sensors disposed on the object and distributed in groups, called clusters, analysis and calculation means making it possible to retrieve the position and/or the attitude of the object, electronic means for generating images and optical projection means comprising a display and projection optics.

The optical projection means emit in a projection cone a sharp image at every point of the displacement zone in which the object can move. Analysis of the portions of images received by the sensors of at least one cluster makes it possible to chart the position and/or the attitude of the object in the reference frame defined by the projection means, the latter consisting of a plane perpendicular to the projection axis, termed the image plane, and of the projection axis.

Finally, this solution coupled with that described in patent FR 0706132 makes it possible to define clusters whose geometric properties are notably linear sensors disposed as parallelograms, therefore coplanar, on the object, the determination of whose motion is sought.

FIG. 1 represents a fixed projector 1 in a reference frame (0, x, y, z) of the prior art, projecting test grids onto sensors 31, 32 disposed in parallel on a mobile part (not represented). The ends A' and B' of the sensor 31 and the ends C' and D' of the sensor 32 are the images of the points $A_0$, $B_0$, $C_0$, $D_0$ of the sensors 31 and 32 before having undergone a translation and a rotation in space. The mappings in the image plane A, B, C, D form a quadrilateral whose vanishing points E and F are determined at the intersections of the straight lines (AB) and (CD) on the one hand and on the other hand by straight lines (AC) and (BD). The calculation of the points E and F making it possible to simply determine the rotation and the translation analytically.

A drawback of such a sensor is the relative-positioning constraint imposed on the linear sensors. Indeed, the positioning on the mobile part of the sensors is such that they must form a parallelogram.

Additionally, in the solution described in patent FR 07 06132, the calculation of the vanishing points requires the calculation of an intersection of straight lines projected in the image plane.

SUMMARY OF THE INVENTION

The invention proposes to solve these problems notably by disposing linear sensors positioned in the reference frame of a mobile part whose posture and kinematics it is sought to determine, such as a pilot helmet.

The present invention makes it possible, on the basis of at least two linear sensors positioned in one and the same plane, to determine the posture of the object by calculating the position of two triples of points of each sensor projected into the image plane.

The invention allows this determination on the basis of a fixed part projecting into a zone comprising the sensors test grids whose patterns comprise at least two secant networks of at least three parallel segments.

Advantageously, the electro-optical system for determining position and orientation of a mobile part comprises:
 a fixed part comprising projection means and having a centre of projection (O) and;
 a mobile part;
the fixed part being linked rigidly with a virtual image plane, the mobile part being linked rigidly with at least two linear electro-optical devices, the projection means projecting into a zone comprising the electro-optical devices, at least two networks of beams, whose intersection with the image plane defines at least two networks of nonparallel straight lines, each of the networks of straight lines comprising at least three parallel segments, each of the electro-optical devices being intercepted at least two triples of points.

Advantageously, the two electro-optical devices being coplanar and their direction secant, the orientation and the position of the mobile part is determined as a function of the vanishing points in the image plane of the two straight lines respectively comprising the first and the second electro-optical devices, calculation means making it possible, on the basis of the points of intersections of the beams on the electro-optical devices, to determine the positions:
 of the projections on the image plane of a first triple of points whose positions are known in a benchmark frame linked with the first device;
 of the projections on the image plane of a second triple of points whose positions are known in a benchmark frame linked with the second device; and
 of the vanishing points in the image plane.

Advantageously, the electro-optical system for determining position and orientation of a mobile part comprises means for determining at least one direction of said mobile part.

Advantageously, the first network intercepts the first electro-optical device at three points ($A_1$, $B_1$, $C_1$) and the second network intercepts the electro-optical device at three other points ($A_2$, $B_2$, $C_2$), the two networks making an angle between themselves such that the shape of the two networks represents a broken line forming at least three saw teeth.

Advantageously, the system successively projects two test grids, whose projection respectively comprises a first and a second network having the same characteristics for which the orientation of the second network with respect to the first network forms a determined angle, the networks having a sufficient size to cover the zone of displacement of the sensor and comprising a determined number of parallel segments, whose cross ratios of four consecutive points of intersection with a secant straight line are all different.

Advantageously, the first triple of points comprises the ends and the centre of the first electro-optical device and the second triple of points comprises the ends and the centre of the second electro-optical device.

Advantageously, the electro-optical devices are photo detection strips.

Advantageously, the electro-optical devices are CCD linear sensors, the fixed part is a moving image projector and the mobile object is a pilot helmet.

Advantageously, the translation t in a fixed reference frame (O, j, k) is determined by the relation: $\vec{t}=k\overrightarrow{OA}-r(\overrightarrow{OA_0})$ where O is the reference point of the fixed part, A the mapping, by projection with centre O, in the image plane of a point A' which is known by measurement of the first electro-optical device whose known initial position is denoted $A_0$ and k being expressed in the following manner:

$$k = |\mu - 1|\frac{A'B'}{OE},$$

where E is the vanishing point, by projection with centre O onto the image plane, of the direction of the first electro-optical device and B' is a second point known by measurement of the first linear electro-optical device whose calculated projection is B, μ is a real expressed in the following manner: $\overrightarrow{AE}=\mu\overrightarrow{AB}$.

Advantageously, the rotation r in a fixed reference frame (O, i, j, k) is determined by the relations:

$$r(\vec{j}) = -\frac{\vec{e}}{\|\vec{e}\|};$$

$$r(\vec{k}) = \frac{1}{\tan\alpha}r(\vec{j}) - \frac{1}{\sin\alpha}\frac{\vec{f}}{\|\vec{f}\|};$$

$$r(\vec{i}) = r(\vec{j}) \wedge r(\vec{k});$$

where $\vec{e}$ is the unit vector having orientation $\overrightarrow{OE}$, where E is the vanishing point of the direction of the first electro-optical device;

where α is the angle formed between the two electro-optical devices on the mobile part; and where $\vec{f}$ is the unit vector having orientation $\overrightarrow{OF}$, where F is the vanishing point of the direction of the second electro-optical device.

BRIEF DESCRIPTION OF THE DRAWINGS

Other characteristics and advantages of the invention will become apparent with the aid of the description which follows, given with regard to the appended drawings which represent.

DETAILED DESCRIPTION OF THE INVENTION

Figure 1:
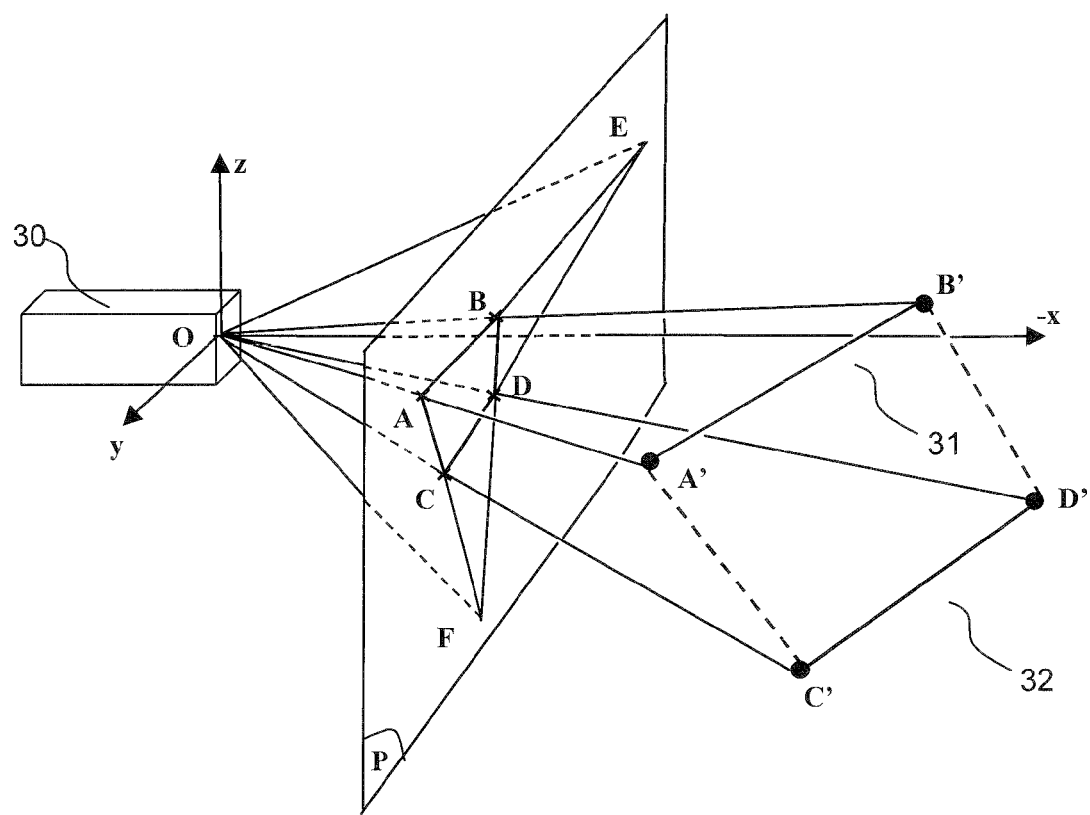
FIG. 1: a prior art device comprising a mobile part having linear sensors forming a parallelogram.

A principle of the invention relates to the determination of the posture and the kinematics of a mobile part in space on the basis of a fixed part comprising an image projector. The mobile part comprises sensors and the fixed part comprises means for projecting test grids.

The test grids are projected into a zone of space comprising the sensors. The test grids comprise patterns intercepting the sensors.

The effectiveness of such a system for detecting motion of a mobile part relies on the form, the number and the disposition of the sensors on the mobile part, moreover it relies on the sharpness of the projected images, of the form and of the brightness of the projected test grids.

A laser optical image projector consists, in one embodiment of the invention:
- of a laser beam generator of fixed power, such as a laser diode and collimated, that is to say slightly divergent so as to ensure a large depth of field;
- of a device for angularly deflecting the laser beam with two mutually perpendicular axes which define the orientation of the projection plane Pi, called the image plane, and the centre of projection O;
- and possibly of an angular expansion objective whose optical axis is perpendicular to the two axes of the deflector and which amplifies the angular deflection of the beam. Preferably, this objective focuses the radiation at a distance close to that where the sensors are positioned, the sensors possibly being for example of photodetector strip type;
- of a device for analysing the signals emanating from each strip;
- of a signal generator supplying the projector in such a way that the image projected and intercepted by each sensor makes it possible to determine subsequently the position of the projection in the projection plane Pi of any point with known position on the sensor. For example, notable points are the ends of the sensor, as well as its middle. The form of the signals may, for example, consist of six plane bundles of known orientation generating six points of impact on each sensor, the positions of which impacts depend on the orientation of the sensor with respect to the fixed reference frame of the projector.

The signals analysis device may, optionally, retroact on the form of the projector control signals so as to optimize the form of the image signals as a function of the signals received from the sensors. For example, the angular centring or amplitude of the projected image may be adjusted.

Other characteristics can be taken into account in such a system notably with regard to the descriptions of the following two published patent applications:

Patent application FR 2 905 456, detailing the GHOST principle according to which an image holographic projector makes it possible to ascertain the motion of an object comprising a certain number of sensors forming clusters.

Patent application FR 2 905 455, detailing a method for detecting the orientation and position of an object in space, such as a pilot helmet, for which the disposition of the sensors on the object can form parallelograms.

A final prerequisite principle for the understanding of the present invention relies on a method for detecting the ends of a linear sensor in space by projections of test grids. This principle is stated in patent application FR 0 706 132.

Figure 2:
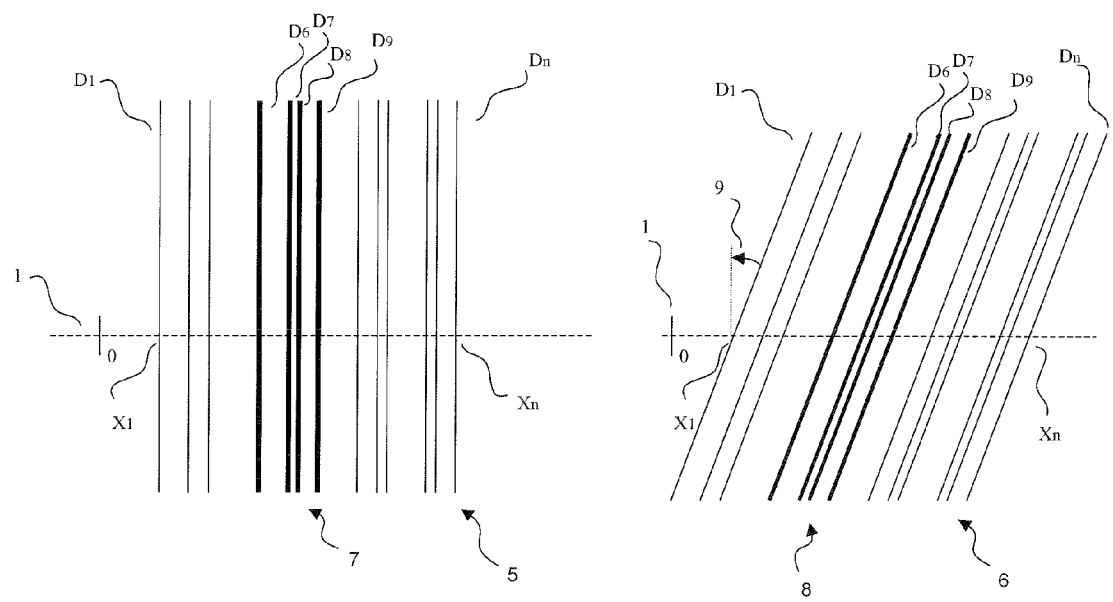
FIG. 2: a first example of the projection onto the image plane of test grids projected onto a sensor forming a network of parallel straight lines.

The latter principle is detailed again in the present description in FIGS. 1 and 2. This principle is used in the present invention, notably to calculate the position of the projection in an image plane of any point of the straight line comprising the linear sensor from the moment at which the position of the point is referenced and known in the benchmark frame of the linear sensor.

Nevertheless, part of the geometric reasoning is performed in the image plane through the consideration of the position of projected points and through the conservation, after projection, of the cross ratios arising from the patterns of the test grids projected onto the sensors. A property of the patterns of the projected test grids is notably that of comprising two secant networks of at least three parallel segments.

Hence what follows is organized in the following manner:
Initially, the present description comprises a reminder of the method of determining a point, on the image plane of a projector, arising from the projection of a point of a sensor illuminated by a test grid whose patterns are known. The latter reminder specifies notably, on the basis of the conservation of the cross ratios in a central projection, how the positions of the mappings of the ends of a sensor can be calculated.
Subsequently, the system of the invention is described together with the application of the method previously described for calculating the position in the image plane of a vanishing point of a straight line in space.

Method of Determining the Mappings of the Ends of a Sensor.

This principle makes it possible, on the basis of projection means, projecting a sharp image in a determined zone comprising at least one linear sensor, to ascertain the ends of the sensor fixed to an object, the ends being charted in the image plane.

The knowledge of the ends of the projection of two linear sensors allows us to ascertain the posture of an object linked rigidly with the two sensors, on condition that the two sensors are not collinear.

This principle comprises various steps of constructing the locus of the ends of a linear sensor in the image plane of the projected image, the sensor being situated in a plane in space.

The principle consists in projecting a test grid in a zone of space comprising the sensor. The image must necessarily be sharp in this zone of space. Such a constraint can be solved by using for example a holographic video projector such as developed by "Light Blue Optics".

The first step of the method recalled in the present description comprises two modes which are differentiated, on the one hand, through the a priori knowledge of the expanse of the zone in which the sensor is situated and, on the other hand, through the type of test grids projected as a function of this zone. A first mode corresponds to a situation of initialization of the method, the position of the sensor not being known in space, the projection field is therefore wide. A second mode corresponds to a situation of feedback control of the system, the position of the sensor being known through an earlier detection, the projection means emit an image along a known direction in a narrower field, whose size is of the order of magnitude of the size of the sensor, the sensor being situated in the field. The latter mode is subsequently called the "tracking" mode since the test grid follows the sensor.

On initialization of the method, the absence of knowledge of the position of the sensor in space makes it necessary to consider, for example, a family of particular test grids covering a wide zone covering the possible zone of displacement of the sensor. In the example of detecting a helmet in a cockpit, the helmet comprising linear sensors, the zone of greater expanse covers a large part of the cockpit.

The second mode corresponds to a detection while a previous position of the sensor is known. This mode makes it possible to define a smaller image than that projected in the first mode. This second mode uses another family of test grids.

In both modes the detection method, having regard to the two families of test grids, is identical. The initialization mode nevertheless proposes a method for detecting the zone in which the sensor is situated which comprises an additional step.

The second mode allows a gain of accuracy in the calculations notably of the position of the image of the sensor in the image plane. Furthermore, this second mode makes it possible to emit test grids whose light density is higher in the emitted patterns than in the first mode, therefore detection is more effective.

This second mode generally operates in a feedback-controlled mode which is initialized by the first mode.

We will dub the test grids used in the first mode: "general test grids", and the test grids of the second mode: "tracking test grids", the two families of test grids being called "GHOST" test grids subsequently in the description.

The test grids are defined in the image plane of the projected image. Generally this plane is not parallel to the plane comprising a sensor.

A principle of the method relies on the fact that the information read on the sensor, corresponding to the traces of the test grid, makes it possible to calculate a central projection invariant. This issue is common to the general test grids and to the tracking test grids.

In both modes, the principle of detection of the ends of a sensor makes it possible, on the basis of the knowledge of three parallel straight lines of the network in the image plane and of their trace on the sensor, to trace in the image plane a straight line passing through each of the ends of the image of the sensor in the image plane.

It is therefore necessary to consider two networks of three parallel straight lines, the networks not possessing the same orientations, so as to trace two straight lines passing through each of the ends of the sensor. In this case, the method makes it possible to deduce the ends of the image of the sensor by constructing the intersections of the straight lines passing through the said ends. This construction is made possible since the projection of an intersection of straight lines is the intersection of the projections of the straight lines.

The objective of the general test grids is distinguished from the tracking test grids through the fact that the triple of straight lines whose trace on the sensor is read is not known a priori; it is therefore necessary to be able to identify it. In this context, the method makes it possible to consider a network of parallel straight lines such that any quadruple of successive straight lines of the network defines a unique cross ratio. The uniqueness of the cross ratio of a quadruple defines a unique quadruple and therefore renders a triple of straight lines intercepting the sensor identifiable. In practice, this may turn out to be difficult to carry out for various reasons. Thus, the method also applies to a set of more than four straight lines. It is possible to envisage identifying in a unique manner not a quadruple, but a quintuple or any set of N straight lines (N greater than 4). For a set of N straight lines, the method applies to a more extensive space and allows the best separation of the points and therefore the groups of straight lines.

The definition of a cross ratio of four aligned points is recalled below.

The cross ratio $B_R$ of four aligned points A, B, C, D is defined by the following relation:

$$B_R(A, B, C, D) = \frac{\overline{AC}}{\overline{BC}} \cdot \frac{\overline{BD}}{\overline{AD}};$$

expressed as an algebraic value by the following relation:

$$B_R(x1, x2, x3, x4) = \frac{x3 - x1}{x3 - x2} \cdot \frac{x4 - x2}{x4 - x1},$$

where x1, x2, x3 and x4 are the abscissae of the points A, B, C, D, the latter being defined on a straight line containing the points and having a reference point of the straight line as origin.

This principle of location by test grids is applied to several sensors each having a different orientation.

Thus, for a given sensor, it is necessary to have available two general test grids, of different directions and sent successively, so as to find the two ends of the mapping of a sensor in the image plane.

Thus, a general test grid consists of any network of straight lines parallel to the image plane such that:
  the network is at one and the same time sufficiently extensive and sufficiently tight, to ensure that it intercepts the sensor in at least four points;
  the network is everywhere sufficiently loose so that it is possible to distinguish without possible confusion on the sensor the spots corresponding respectively to any 2 adjacent straight lines of the network;
  the mapping which sends any quadruple or more of successive straight lines of the network to its inherent cross ratio is a bijection, and this bijection is sufficiently dispersive to ensure that it is always possible to retrieve the antecedent quadruple without possible confusion.

FIG. 2 represents an example of two networks 5 and 6 sent successively from two general test grids, making an angle 9 between themselves. The two quadruples 7 and 8 consist of the straight lines D6, D7, D8, D9 and possess a single cross ratio. The detection of the four points of intersection of each network on the sensor makes it possible to identify a zone of smaller expanse so as to project tracking test grids such as described hereinafter in FIG. 2. Moreover, the method makes it possible according to the method described subsequently on the basis of the tracking test grids to construct the ends of the image of the sensor in the image plane. It suffices to apply the method to the two networks sent successively and to consider three straight lines of each quadruple of each network intercepting the sensor.

The duration between two projections of two general test grids is necessarily limited in such a way that the sensor does not perform too large a motion in space during its movement.

The method makes it possible in the two aforementioned modes to construct the ends of the image of the sensor in the image plane on the basis of two networks projected simultaneously (case of the tracking test grids) or successively (case of the general test grids), the networks comprising at least three parallel straight lines (or segments) in the case of the tracking test grids and at least four straight lines in the case of the general test grids.

The method makes it possible to send two networks of three straight lines, the networks not being parallel, so as to retrieve the ends of the mapping of the linear sensor in the image plane.

In the first mode, the two networks of straight lines, each constituting a general test grid, are projected successively in the zone comprising the sensor. On the other hand, in the second mode, the two networks of straight lines (or segments) are projected in a unique tracking test grid, that is to say as a single image.

Figure 3:
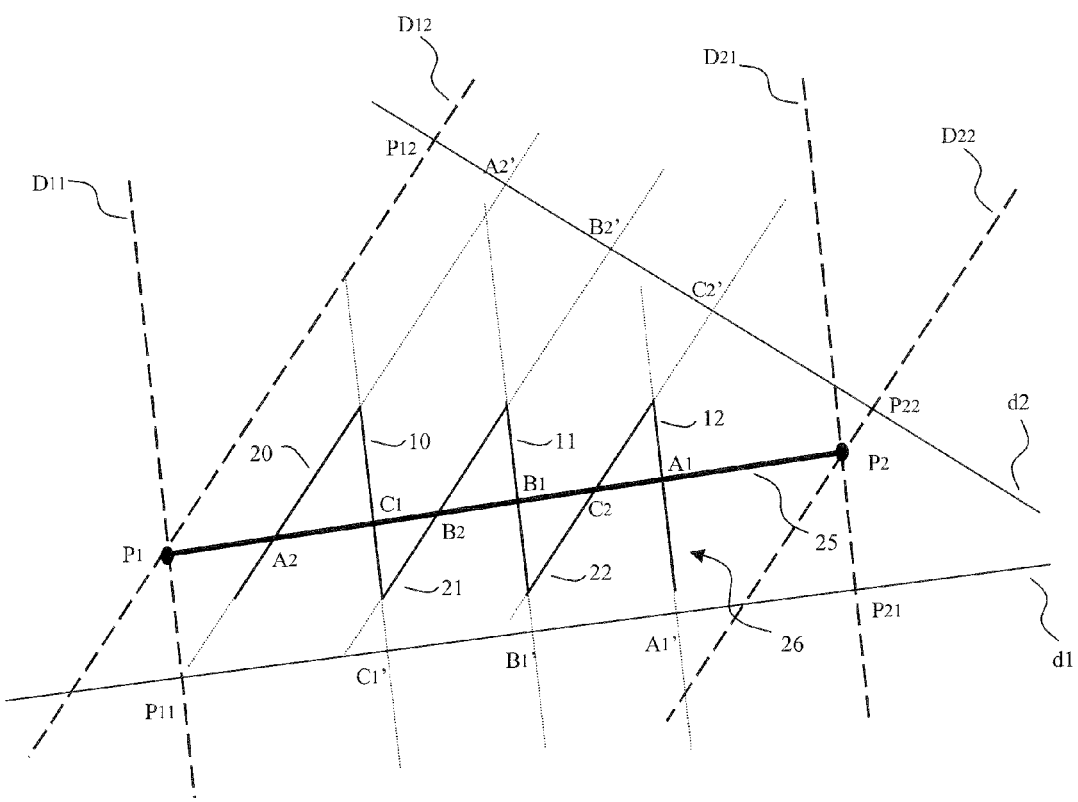
FIG. 3: a second example of the projection onto the image plane of test grids projected onto a linear sensor forming teeth.

FIG. 3 illustrates a tracking test grid 26 in the projection image plane. It comprises a first network of three mutually parallel luminous segments 10, 11 and 12 and a second network of three segments 20, 21 and 22. The two networks projected in the some image simultaneously are not parallel and are joined by the ends of the segments. In the example of FIG. 3, they are joined by the upper ends of each segment forming a sawteeth figure.

In practice, the image consisting of the luminous segments is deformed in the straight line or the plane comprising the sensor, by a conical projection, when it intercepts the linear sensor, the plane of the sensor and the plane of the projected image not being a priori parallel. The sensor therefore detects the luminous points which correspond to the points of intersection of the projected image with the sensor. The method considers the image of the sensor in the plane of the projected image, the image of the sensor then being deformed by the conical projection considered above, in the image plane.

FIG. 3 represents the image 25 of the sensor in the image plane. The cross ratios of the distances between the points of intersection of the sensor and of the straight lines of the network are conserved by the conical projection. The image 25 of the sensor comprises two ends P1 and P2 in the image plane which are not known a priori, the construction of their position in the image plane constituting the core of the method. Moreover, in the image plane the first network intercepts the image 25 of the sensor at three points A1, B1 and C1, these last three points being the mappings in the image plane of the points of intersection of the first network with the sensor. The second network intercepts the image 25 of the sensor at three other points A2, B2 and C2, these last three points being the mappings in the image plane of the points of intersection of the second network with the sensor.

The method subsequently described is also valid for the general test grids and constitutes the second step of the method.

When considering the sensor in space, one of the ends of the sensor may be considered to be the origin of a reference frame comprising the abscissa axis borne by the axis of the sensor; 0, $x_{A2}$, $x_{C1}$, $x_{B2}$, $x_{B1}$, $x_{C2}$, $x_{A1}$, $x_{max}$ then denote the respective abscissae of the points of intersection of the first and of the second network with the sensor as well as the other end of the sensor, their mappings in the image plane being respectively the points P1, A2, C1, B2, B1, C2, A1 and P2 in the plane of the sensor.

The method makes it possible to consider the cross ratios $k_{11}$, $k_{12}$, $k_{21}$, $k_{22}$ of quadruples of points defined on the abscissa axis of the axis of the sensor by the following relations, $B_R$ being the cross ratio of four previously defined points:

$$k_{11}=B_R(x_{A1},x_{B1},x_{C1},0);$$

$$k_{12}=B_R(x_{C1},x_{B1},x_{A1},x_{max});$$

$$k_{21}=B_R(x_{C2},x_{B2},x_{A2},0);$$

$$k_{22}B_R(x_{A2},x_{B2},x_{C2},x_{max}).$$

Finally the third step of the method makes it possible to construct the ends of the image of the sensor in the image plane. The aim being to find the ends of the image of the sensor in the image plane, by construction under conical projection and conservation of the cross ratios in the plane of the sensor and in the image plane of the quadruples previously considered, the position of the sensor in space is then calculated. Accordingly, the method proposes to use notably the conservation of the cross ratios of four points under conical and cylindrical projections.

Concerning the conical projection relating to the projection of the image onto the sensor, the method makes it possible to consider the cross ratios $k_{11}$, $k_{12}$, $k_{21}$, $k_{22}$, conserved by the conical projections of the quadruples of the points defined previously on the sensor, by the following relations:

$$k_{11}=B_R(A1,B1,C1,P1);$$

$$k_{12}=B_R(C1,B1,A1,P2);$$

$$k_{21}=B_R(C2,B2,A2,P1);$$

$$k_{22}=B_R(A2,B2,C2,P2).$$

The method firstly proposes to construct in the image plane two straight lines perpendicular to each network. The first straight line d1 is perpendicular to the first network, it is placed arbitrarily in the lower part of the image. The straight lines 10, 11 and 12 bearing the luminous segments of the first network intercept the straight line d1 at three points A1', B1' and C1'. In the same manner, the second straight line d2 is perpendicular to the second network, it is placed arbitrarily in the upper part of the image. The straight lines 20, 21 and 22 bearing the luminous segments of the second network intercept the straight line d2 at three points A2', B2' and C2'.

One seeks to determine the ends P1 and P2 of the image of the sensor in the image plane. Each of these points possesses two mappings on the straight lines d1 and d2 along the axis parallel respectively to the first and to the second networks. We denote by P11 the mapping of P1 on d1 along the axis of the first network and by P12 the mapping of P1 on d2 along the axis of the second network. In an analogous manner, we denote by P21 the mapping of P2 on d1 along the axis of the first network and by P22 the mapping of P2 on d2 along the axis of the second network.

The method makes it possible to consider the cross ratios $k_{11}$, $k_{12}$, $k_{21}$, $k_{22}$, conserved by the cylindrical projections of the quadruples of the points defined previously on the straight lines d1 and d2, by the following relations:

$$k_{11}=B_R(A1',B1',C1',P11);$$

$$k_{12}=B_R(C1',B1',A1',P21);$$

$k_{21} = B_R(C2', B2', A2', P12);$ $k_{22} = B_R(A2', B2', C2', P22).$

From which it is possible to deduce:
the point P11 knowing $k_{11}$ and A1', B1', C1';
the point P12 knowing $k_{12}$ and A1', B1', C1';
the point P21 knowing $k_{21}$ and A2', B2', C2';
the point P22 knowing $k_{22}$ and A2', B2', C2'.

Next, it is possible to construct in the image plane the straight lines:
D11 knowing P11 and the direction of projection of projection along the axis of the first network;
D21 knowing P21 and the direction of projection of projection along the axis of the second network;
D12 knowing P12 and the direction of projection of projection along the axis of the first network;
D22 knowing P22 and the direction of projection of projection along the axis of the second network;

The two directions being known by construction of the test grid.

The two ends of the image of the sensor in the image plane are obtained according to the method by construction:

$P1 = D11 \cap D12;$ $P2 = D21 \cap D22.$

Algebraically, the latter operation in two dimensions possesses a solution provided that the two networks are not collinear. By construction they are not collinear for the tracking test grids when they are projected onto one and the same image and neither are they collinear when successively sending two general test grids.

The demonstration is identical for two non-parallel networks sent successively by the projection of general test grids, the time between two sends being short enough to consider that the sensor has hardly changed position in space.

Application of the Principle to the Present Invention.

The system according to the invention makes it possible to use the latter principle by no longer considering the two ends of the sensors but any point whatsoever of a first sensor for which one knows the abscissae in the benchmark frame of the sensor and the relative positions of three points of a second.

The mobile part with respect to the fixed reference frame constituted by the fixed part is equipped:
with a first electro-optical device fixed on the mobile part;
with a second electro-optical device coplanar with the first electro-optical device and not parallel.

In a favoured embodiment, the fixed part is an image projector such as described previously and the electro-optical devices are photo detection strips.

The mobile part may be a pilot helmet.

A mode of operation of the invention makes it possible to utilize particular light beams, such as described previously, provided by the projector determining luminous impacts on the electro-optical devices.

The analysis of the position of these impacts on the electro-optical devices by means of the electrical signals provided by said devices, makes it possible to calculate the position of the virtual projections with centre 0 in the image plane for any point with given position on the axis of the electro-optical devices.

Figure 4:
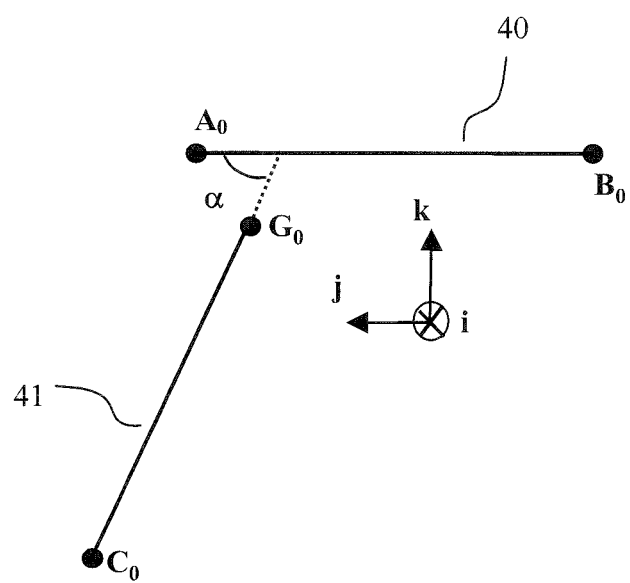
FIG. 4: a disposition according to the invention of two linear sensors in one and the same plane, oriented with respect to one another by a nonzero angle.

FIG. 4 represents the two electro-optical devices 40, 41 in one and the same plane and positioned in a fixed reference frame in space. The ends $A_0$, $B_0$, $C_0$ and $G_0$ of the two devices are positioned such that $A_0$ is in the central position of the reference frame (O, i, j, k). The two axes of the electro-optical devices 40, 41 form a fixed angle $\alpha$.

Figure 5:
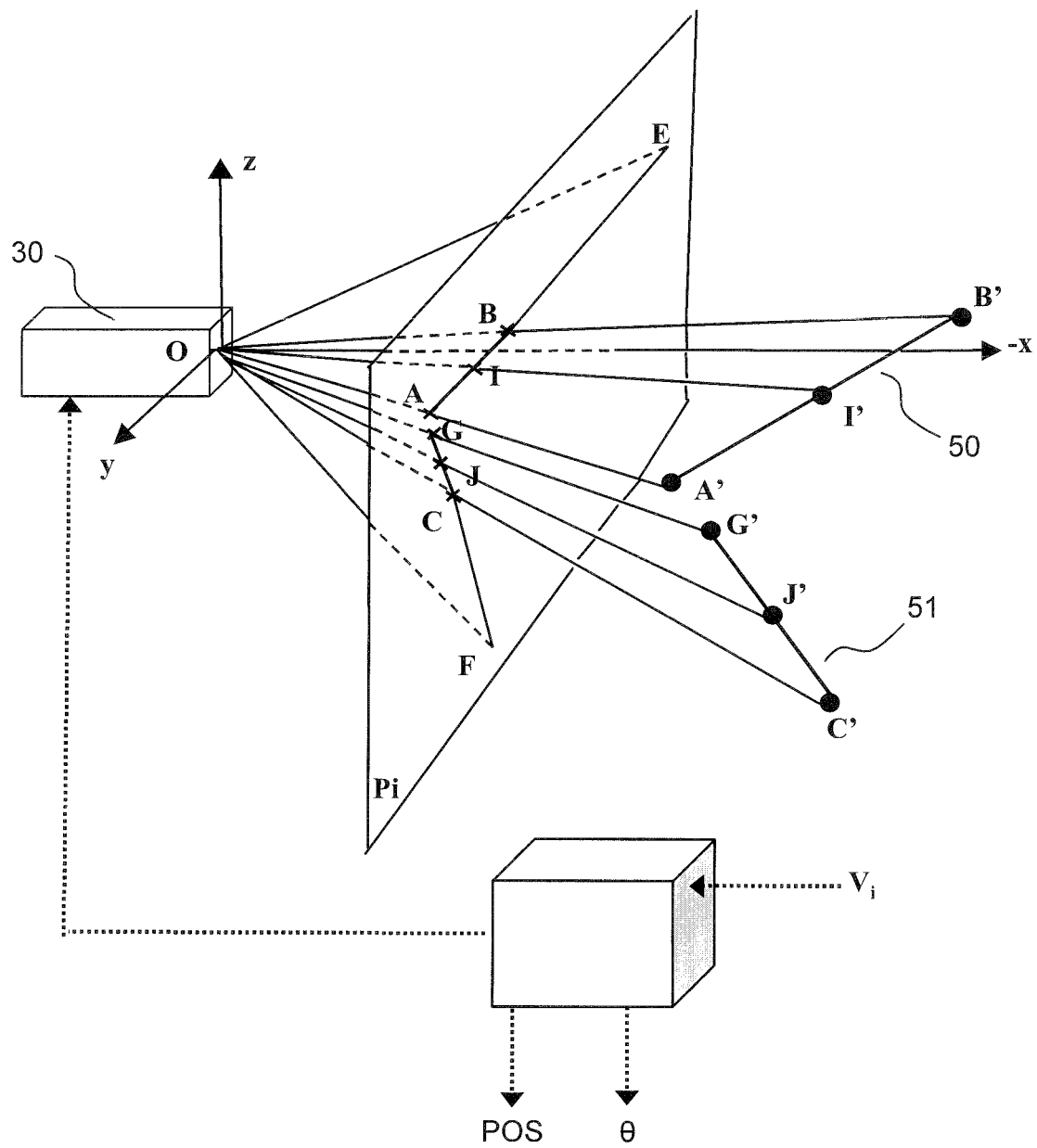
FIG. 5: an example of calculating the vanishing points of the mappings of points of the sensors according to the invention.

FIG. 5 represents the two devices A'B' and G'C' rigidly linked with a mobile part, not represented in the figure. The middle of the first electro-optical device is dubbed "I" and the middle of the second electro-optical device is dubbed "J".

A nonzero angle $\alpha$ of orientation between the axes of the two electro-optical devices is determined by construction. Regardless of the movements of the mobile part, the angle $\alpha$ between the two devices fixed to said mobile part remains constant.

On the other hand, upon projection by the fixed part of a test grid of GHOST type onto the devices, only the relative positions of the points of the sensors illuminated by the test grid are known by measurements.

The measurements are performed on the basis of an electronic device making it possible on the basis of voltage $(V_1)_{i \in [1,n]}$ to ascertain the position on the linear sensor of the illuminated pixels. The position of the pixels being referenced by their abscissae x, on the sensor.

The principle recalled above allows us to obtain, for example, the locus of the ends of the projections of the devices in the image plane.

The calculations, detailed subsequently in the description, make it possible to then deduce the position POS and the orientation $\theta$ of the sensors in space with respect to an initial position and initial orientation of the mobile part.

For example, the positions of the mappings of the ends A', B', G', C' and the middles I', J' of the electro-optical devices in the image plane may be calculated. The position POS and the orientation of the mobile part are entirely determined by the position O of the corresponding projections A, B, I, G, C, J, on the known fixed image plane Pi.

For this purpose, a reference frame, with origin O, is considered; the image plane is for example the plane with equation $x = -1$.

Basically, a GHOST test grid (for initialization or tracking) comprises at least two networks of three parallel straight lines. The equations of the straight lines of FIG. 2, known in the image plane, can take the following form:

$y \sin \Theta 1 - z \cos \Theta 1 = c_{11};$ $y \sin \Theta 1 - z \cos \Theta 1 = c_{12};$ $y \sin \Theta 1 - z \cos \Theta 1 = c_{13};$ where $\Theta 1$ is the angle formed by each of the segments of a first network of parallel straight lines with the sensor in the image plane, $y \sin \Theta 2 - z \cos \Theta 2 = c_{21};$ $y \sin \Theta 2 - z \cos \Theta 2 = c_{22};$ $y \sin \Theta 2 - z \cos \Theta 2 = c_{23};$ where $\Theta 2$ is the angle formed by each of the segments of a second network of parallel straight lines with the sensor in the image plane.

The planes of projection of these straight lines cut the sensor considered at six points with measured and identified abscissae denoted for a given sensor: $a_{11}, a_{21}, a_{12}, a_{22}, a_{13}, a_{23}$ representing respectively the abscissae previously denoted: $x_{A2}, x_{C1}, x_{B2}, x_{B1}, x_{C2}, x_{A1}$.

To determine the image of an arbitrary point which is on the straight line comprising the electro-optical device, a point M is considered on the straight line bearing the sensor and having a known abscissa $X_M$ on the said straight line.

The image of M is at the intersection of the following constructed straight lines:

$$y \sin \Theta_1 - z \cos \Theta_1 = c_{1M};$$

$$y \sin \Theta_2 - z \cos \Theta_2 = c_{2M}.$$

Using the above six straight line equations, the coefficients $c_{1M}$ and $c_{2M}$ can be expressed in the following manner, for i=1 or 2:

$$c_{iM} = \frac{t_i \cdot c_{i2} \cdot (c_{i3} - c_{i1}) - c_{i1}(c_{i2} - c_{i2})}{t_i \cdot (c_{i3} - c_{i1}) - (c_{i3} - c_{i2})},$$

with $$t_i = \frac{(X_M - a_{i1}) - (a_{i3} - a_{i2})}{(X_M - a_{i2}) - (a_{i3} - a_{i1})}.$$

In a first case, if $X_M = a_{i2}$, we then have $c_{iM} = c_{i2}$.

The coordinates of the mapping $m(y_m, z_m)$ of M in the image plane are then obtained:

$$y_M = \frac{c_{2M} \cdot \cos\theta_1 - c_{1M} \cdot \cos\theta_2}{\sin(\theta_2 - \theta_1)};$$

$$z_M = \frac{c_{2M} \cdot \sin\theta_1 - c_{1M} \cdot \sin\theta_2}{\sin(\theta_2 - \theta_1)}.$$

The positions of the corresponding projections A, B, I on the image plane Pi, are determined by replacing in the above equations, notably the equation for $t_i$, the abscissae $X_{A'}$, $X_{B'}$, $X_{I'}$ known in the benchmark frame of the first electro-optical device of each of the points A', B', I'.

From this we deduce the position of the points A, B and I in the image plane.

In the same manner, we find the coordinates of the points C, G and J in the image plane.

The invention is not limited to the choice of the ends and of the centre of each electro-optical device, but also allows a choice of a triple of points whose relative abscissae on the electro-optical device are known.

For example, two points P' and Q' and a third point R', such that the ratio $$\frac{P'Q'}{P'R'}$$

is known.

Finally, it is moreover necessary to ascertain at least one metric abscissa of one of the points on an electro-optical device.

We call a metric abscissa the real distance from a point of the sensor to an origin point linked to the sensor, for example one of its ends.

We call a relative abscissa the distance counted in terms of pixel from a point to a reference pixel, for example the pixel corresponding to an end of the sensor.

For the determination of the orientation and the position of the mobile part, as regards the second electro-optical device, if a metric abscissa of a point is known on the first device, then it is not necessary to know one on the second device, since the orientation of the two devices with respect to one another is known by construction.

The relative disposition of the sensors being known, notably their position with respect to one another, it is not necessary to know the metric position of each of the six points sought on the linear sensors.

The position of a single point and the relative positions of the other points with respect to the latter point are sufficient to determine the position of the other 5 points.

In practice, and in the majority of cases the positions of the six points sought, such as A', B', I', G', C' and J', are known for the applications of the invention.

The description which follows considers the knowledge of the ends of the devices and of their centre, but the lines of argumentation which follow are identical with the knowledge of three known relative abscissae of each electro-optical device and the knowledge of a metric abscissa of at least one point on one of the electro-optical devices.

If we consider the position of the vanishing point E in the image plane of the straight line comprising the first electro-optical device, the direction of the first electro-optical device is given by the construction of the straight line (OE).

In the same manner, if we consider the position of the vanishing point F in the image plane of the straight line comprising the second electro-optical device, the direction of the second electro-optical device is given by the construction of the straight line (OF).

Determination of the Points E and F

The calculation of the position of the projections in the image plane Pi of the vanishing points of the straight lines (A'B') and (C'G') utilizes the fact that the two bundles of the four straight lines emanating from O passing respectively through the points A, I, B, E and through the points G, J, C, F are both harmonic bundles.

The four concurrent coplanar straight lines OA', OI', OB', OE form a harmonic bundle. This bundle of straight lines therefore determines on any secant four points in harmonic division, their cross ratio being equal to −1. Consequently, the following equality:

$$\frac{BA}{BI} = \frac{EA}{EI},$$

provides the position of the vanishing point E of the straight line (A'B') on the straight line (AB).

In the same manner, the four concurrent coplanar straight lines OC', OJ', OG', OF form a harmonic bundle. This bundle of straight lines therefore determines on any secant four points in harmonic division, their cross ratio being equal to −1. Consequently, the following equality:

$$\frac{CG}{CJ} = \frac{FG}{FJ},$$

provides the position of the vanishing point F of the straight line (C'G') on the straight line (CG).

In particular, the directions joining the centre of projection O to the vanishing points E and F on the plane Pi give the directions of the electro-optical devices A'B' and G'C'.

Determination of the Components of the Motion.

Any motion undergone by the mobile part in space may be decomposed into a translation and a rotation in space.

If A', B', C' and G' denote the images of the points $A_0$, $B_0$, $C_0$ and $G_0$ after the rotation and the translation undergone by the mobile object, denoting by $\vec{t}$ the translation and by r the rotation, we obtain the following relations:

$$\overrightarrow{OA'} = \overrightarrow{t} + r(\overrightarrow{OA_0});$$

$$\overrightarrow{OB'} = \overrightarrow{t} + r(\overrightarrow{OB_0});$$

$$\overrightarrow{OC'} = \overrightarrow{t} + r(\overrightarrow{OC_0});$$

$$\overrightarrow{OG'} = \overrightarrow{t} + r(\overrightarrow{OG_0});$$

where O is the origin of the reference frame.

The vectors formed by the ends of the electro-optical devices become:

$$\overrightarrow{A'B'} = r(\overrightarrow{A_0B_0});$$

$$\overrightarrow{C'G'} = r(\overrightarrow{C_0G_0}).$$

From this we deduce that $\overrightarrow{G'C} = G_0 C_0 [\cos \alpha \cdot r(\vec{j}) - \sin \alpha \cdot r(\vec{k})]$ The method recalled in the description of FIGS. 2 and 3 as well as its application for determining the mappings in the image plane of the fixed part of a vanishing point of a straight line in space, allows us to find vectors $\vec{E}$ and $\vec{F}$, such that:

$\vec{E}$ is nonzero and positively proportional to $\overrightarrow{A'B'}$;

$\vec{F}$ is nonzero and positively proportional to $\overrightarrow{G'C'}$.

It is then possible to define the two normalized vectors $\vec{e}$ and $\vec{f}$, such that:

$$\vec{e} = \frac{\vec{E}}{\|\vec{E}\|};$$

$$\vec{f} = \frac{\vec{F}}{\|\vec{F}\|}.$$

We therefore obtain the following relations:

$$\vec{e} = \frac{\overrightarrow{A'B'}}{A'B'};$$

$$\vec{f} = \frac{\overrightarrow{G'C'}}{G'C'}.$$

The determination of the rotation r where $\alpha$ is nonzero is obtained by construction, since the two linear electro-optical devices are positioned on the mobile part in such a way as to form a fixed and invariant angle between themselves.

$$r(\vec{j}) = -\frac{\vec{e}}{\|\vec{e}\|};$$

$$r(\vec{k}) = \frac{1}{\tan\alpha} r(\vec{j}) - \frac{1}{\sin\alpha} \frac{\vec{f}}{\|\vec{f}\|};$$

$$r(\vec{i}) = r(\vec{j}) \wedge r(\vec{k});$$

and the determination of the translation:

with $\overrightarrow{OA'} = \vec{t} + r(\overrightarrow{OA_0})$

If $\mu_E$ denotes the known real such that $\overrightarrow{AE} = \mu_E \overrightarrow{AB}$, and k denotes the real such that $\overrightarrow{OA'} = k\overrightarrow{OA}$, then we have:

$$k = \frac{A'B'}{OE} |\mu_E - 1|$$

The sought-after translation is $\vec{t} = k\overrightarrow{OA} - r(\overrightarrow{OA_0})$, where OA is known after determining the position of A in the image plane.

Consequently, the determination of the motion of the mobile part is entirely determined in space and expressed in the reference frame (O, i, j, k).

The principal advantage of the invention is that it does away with the condition regarding the relative position of the electro-optical devices with respect to one another. Only the knowledge of their relative orientation is necessary.

Additionally, the invention presents the advantage of relaxing the constraints about mechanical accuracy with regard to the disposition of the sensors, and hence makes it possible to transfer the problem of mechanical tolerancing into a matter of installation on the helmet.

Additionally, in comparison with an extensive sensor, of the square shaped type, the device with two coplanar sensors whose directions are secant makes it possible:

to relax the constraints regarding installation on a helmet;
to envisage mounting bigger sensors and therefore to improve the measurement accuracy of the system, indeed the size of the sensor is a significant element in the accuracy of the system. In the case of a linear sensor, it is possible to double the size of the sensor on a helmet;
to employ sensors which have very little sensitivity to expansion and therefore to ambient temperature. The sensor being linear, its expansion does not transform its associated direction vector and therefore has zero impact on the attitude measurement carried out, on the other hand it may have an impact on the position measurement.

Finally, the necessary calculational power is reduced with respect to an approach based on parallel linear CCD-type sensors since the present invention makes it possible to easily calculate the vanishing points linked with the direction vectors instead of having to determine it by intersection of virtual points.

The calculation of the position of the vanishing points requires a calculation of the conservation of a homothetic ratio.

The invention claimed is:

1. Electro-optical system for determining position and orientation of a mobile part, said system comprising a fixed part comprising projection means and having a center of projection and the mobile part, the fixed part being linked rigidly with a virtual image plane, the mobile part being linked rigidly with at least a first linear electro-optical device and a second linear electro-optical device, the projection means projecting into a zone comprising the electro-optical devices, at least two networks of beams, whose intersection with the image plane defines at least two networks of nonparallel straight lines, each of the networks of straight lines comprising at least three parallel segments, each of the first and second electro-optical devices being intercepted by the networks of beams at at least two triples of points, wherein the two electro-optical devices being coplanar and their direction secant, the orientation and the position of the mobile part is determined using a first vanishing point E and a second vanishing point F, in the image plane, respectively of a first straight line comprising the first linear electro-optical device and of a second straight line comprising the second linear electro-optical device, calculation means determining, on the basis of the points of intersections of the networks of beams on the first and second linear electro-optical devices, positions of:
  a. projections on the image plane of a first triple (A, I, B) of points whose positions are known in a benchmark frame linked with the first linear electro-optical device;
  b. projections on the image plane of a second triple of points (C, J, G) whose positions are known in a benchmark frame linked with the second linear electro-optical device; and,
  c. the first vanishing point E and of the second vanishing point F.

2. Electro-optical system for determining position and orientation of a mobile part according to claim 1, wherein the two networks of beams comprising a first network of beams intercepting an image of the first linear electro-optical device on the image plane at three points ($A_1$, $B_1$, $C_1$) and a second network of beams intercepting an image of the first linear electro-optical device at three other points ($A_2$, $B_2$, $C_2$), the two networks of beams making an angle between themselves such that the shape of the two networks represents a broken line forming at least three saw teeth.

3. Electro-optical system for determining position and orientation of a mobile part according to claim 1, wherein the system successively projects two test grids, whose projection respectively comprises a first and a second network having the same characteristics for which the orientation of the second network with respect to the first network forms a determined angle, the networks having a sufficient size to cover the zone of displacement of the sensor and comprising a determined number of parallel segments, whose cross ratios of four consecutive points of intersection with a secant straight line are all different.

4. Electro-optical system for determining position and orientation of a mobile part according to one of claims 1 to 3, wherein the first triple of points comprises the ends and the center of the first linear electro-optical device and that the second triple of points comprises the ends and the center of the second linear electro-optical device.

5. Electro-optical system for determining the position and orientation of a mobile part comprising means for determining at least one direction of said mobile part according to one of claims 1 to 3, wherein the electro-optical devices are photo detection strips.

6. Electro-optical system for determining position and orientation of a mobile part comprising means for determining at least one direction of the mobile part according to one of claims 1 to 3, characterized in that the electro-optical devices are CCD linear sensors, the fixed part is a moving image projector and the mobile part is a pilot helmet.

7. Electro-optical system for determining the position and orientation of a mobile part according to any one of claims 1 to 3, wherein a translation t in a fixed reference frame (O, i, j, k) is determined by the relation: $\vec{t}=k\overrightarrow{OA}-r(\overrightarrow{OA_0})$ here O is the reference point of the fixed part, A the mapping, by projection with center O, in the image plane of a point A' which is known by measurement of the first linear electro-optical device whose known initial position is denoted $A_0$ and k being expressed in the following manner:

$$k = |\mu - 1|\frac{A'B'}{OE}$$

where E is the first vanishing point and B' is a second point known by measurement of the first linear electro-optical device whose calculated projection is B, $\mu$ is a real expressed in the following manner: $\overrightarrow{AE}=\mu\overrightarrow{AB}$.

8. Electro-optical system for determining the position and orientation of a mobile part according to any one of claims 1 to 3, Wherein a rotation r in a fixed reference frame (O, i, j, k) is determined by the relations:

a. $r(\vec{j}) = -\frac{\vec{e}}{\|\vec{e}\|}$;

b. $r(\vec{k}) = \frac{1}{\tan\alpha}r(\vec{j}) - \frac{1}{\sin\alpha}\frac{\vec{f}}{\|\vec{f}\|}$;

c. $r(\vec{i}) = r(\vec{j}) \wedge r(\vec{k})$;

d. where $\vec{e}$ is the unit vector having orientation $\overrightarrow{OE}$, where E is the vanishing point of the direction of the first electro-optical device;
  e. where $\alpha$ is the angle formed between the two electro-optical devices on the mobile part; and
  f. where $\vec{f}$ is the unit vector having orientation $\overrightarrow{OF}$, where F is the second vanishing point.

* * * * *

UNITED STATES PATENT AND TRADEMARK OFFICE
CERTIFICATE OF CORRECTION

PATENT NO. : 8,675,911 B2  
APPLICATION NO. : 12/567228  
DATED : March 18, 2014  
INVENTOR(S) : Bruno Barbier and Siegfried Rouzes Page 1 of 1

It is certified that error appears in the above-identified patent and that said Letters Patent is hereby corrected as shown below:

In the specification:

Column 4, line 30; delete "(O, j, k)" and replace with --(O, i, j, k)--;
Column 12, line 18; delete "X" and replace with --X.sub.1--;
Column 12, line 30; delete "O" and replace with --.theta.--;
Column 13, line 13; delete "(C.sub.i2 - C.sub.i2)" and replace with --(C.sub.i3 - Csub.i2)--; and
Column 15, line 1; add --)-- before the ";" and after the subscript 0.

Signed and Sealed this  
Tenth Day of June, 2014

Michelle K. Lee  
*Deputy Director of the United States Patent and Trademark Office*